(12) United States Patent
Soininen et al.

(10) Patent No.: US 8,970,834 B2
(45) Date of Patent: Mar. 3, 2015

(54) METHOD FOR CALIBRATING A SENSOR CLUSTER IN A MOTOR VEHICLE

(71) Applicant: Volvo Car Corporation, Gothenburg (SE)

(72) Inventors: Martti Soininen, Gothenburg (SE); Martin Vinranke, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 14/171,949

(22) Filed: Feb. 4, 2014

(65) Prior Publication Data

US 2014/0233023 A1 Aug. 21, 2014

(30) Foreign Application Priority Data

Feb. 18, 2013 (EP) ..................................... 13155637

(51) Int. Cl.
*G01B 11/26* (2006.01)
*G01S 17/93* (2006.01)
*G01S 7/497* (2006.01)
*G01S 13/86* (2006.01)
*G01S 13/93* (2006.01)
*G01S 7/40* (2006.01)

(52) U.S. Cl.
CPC ............... *G01B 11/26* (2013.01); *G01S 17/936* (2013.01); *G01S 7/4972* (2013.01); *G01S 13/867* (2013.01); *G01S 13/931* (2013.01); *G01S 2007/4034* (2013.01)
USPC ....................................................... 356/138

(58) Field of Classification Search
USPC ....................................................... 356/138
See application file for complete search history.

(56) References Cited

U.S. PATENT DOCUMENTS

| 2002/0072869 | A1* | 6/2002 | Stiller .............................. 702/90 |
| 2007/0165967 | A1 | 7/2007 | Ando et al. |
| 2009/0033926 | A1* | 2/2009 | Haug .......................... 356/243.1 |
| 2012/0140061 | A1 | 6/2012 | Zeng |
| 2012/0236124 | A1 | 9/2012 | Aoki |

FOREIGN PATENT DOCUMENTS

| EP | 1808711 | 7/2007 |
| EP | 2500748 | 9/2012 |

OTHER PUBLICATIONS

Extended European Search Report for EP 13155637.5, Completed by the European Patent Office on Jul. 15, 2013, 6 Pages.

* cited by examiner

*Primary Examiner* — Roy M Punnoose
(74) *Attorney, Agent, or Firm* — Brooks Kushman P.C.

(57) ABSTRACT

A method is disclosed for calibrating a sensor cluster located at an inside of a windshield of a motor vehicle and arranged such that the pitch thereof is adjustable. The sensor cluster may include a narrow beam sensor and an imaging sensor, both of which are directed forward of the motor vehicle. An angle gamma ($\gamma$) between center directions of the narrow beam sensor and the imaging sensor has been pre-calibrated and stored in at least one memory unit. The method may include calibrating at least one of the narrow beam sensor and the imaging sensor with respect to a geometrical travel axis of the vehicle, recording a measure epsilon ($\epsilon$) corresponding to an angle between the center direction of the imaging sensor and a reference provided by a fixed vehicle structural part, and storing the recorded measure epsilon ($\epsilon$) in the at least one memory unit.

14 Claims, 2 Drawing Sheets

METHOD FOR CALIBRATING A SENSOR CLUSTER IN A MOTOR VEHICLE

CROSS-REFERENCE TO RELATED APPLICATIONS

This application claims foreign priority benefits under 35 U.S.C. §119(a)-(d) to European patent application number EP 13155637.5 filed Feb. 18, 2013, which is incorporated herein by reference in its entirety.

TECHNICAL FIELD

Embodiments herein relate to a method for calibrating a sensor cluster which is located at an inside of a windshield of a motor vehicle, which sensor cluster at least comprises a narrow beam sensor and an imaging sensor.

Further embodiments herein relate to a motor vehicle comprising a sensor cluster, which at least comprises a narrow beam sensor and an imaging sensor, and which sensor cluster has been calibrated in accordance with the above method.

BACKGROUND

In motor vehicles, sensor clusters are used for recording the vehicle environment. In particular, sensor clusters are used in driver assistance systems.

To provide data for such driver assistance systems, the use of sensor clusters in motor vehicles is becoming more and more common, sometimes comprising different technology sensors, the ranges of which may at least partially overlap. In particular, the use of sensor clusters that are made up of two different sensors, one narrow beam sensor, such as e.g. a Radio Detection And Ranging (RADAR) technology sensor or a Light Detection And Ranging (LIDAR) technology sensor or other sensor based on Light Amplification by Stimulated Emission of Radiation (LASER) technology, and one imaging sensor, both of which covers essentially the same scene.

Sensor clusters of the kind comprising a narrow beam technology sensor and at least one imaging sensor are usually arranged in a vehicle at the inside of a windshield in the vicinity of a rear-view mirror and such that the sensors of the cluster are forward looking, in relation to the normal direction of travel of the vehicle.

Alignment of the narrow beam sensor of the sensor cluster with respect to the geometrical travel axis of the motor vehicle is critical for its proper operation, and must therefore normally be done such that the deviation from this axis lies within ±1°. In order to meet these demands this kind of sensor clusters are normally calibrated at a designated station during vehicle manufacture or at a special calibration workshop for replacement and repairs. The demands for such a designated station are strict, e.g. the floor thereof has to be perfectly level and horizontal and the vehicle, for which calibration is to be performed, often has to be placed perfectly positioned and aligned at this floor, such that the relation to special calibration targets is ensured. Upon calibration the sensors of the sensor cluster of the perfectly placed and aligned vehicle are calibrated towards the special calibration targets. Accurate alignment with the vehicle is tedious and requires special instrumental technology.

As is evident from the above description this calibration process is both cumbersome and costly, in addition to requiring such special facilities that, for e.g. cost reasons, cannot be provided at more than a few specialized repair-shops, necessitating sometimes lengthy and costly trips to have a sensor cluster calibrated following replacement thereof or replacement of the windshield to which it is mounted.

Several attempts have been made to facilitate calibration of vehicle mounted sensors without relying on such costly and sparsely available dedicated calibration stations. One such attempt is illustrated by US2009033926, which relates to a device for calibrating an imaging sensor system in a motor vehicle. This is accomplished according to US2009033926 by providing a calibration object on the inside of an engine hood of the vehicle in such a way that after raising the engine hood, the calibration object is within detection range of the imaging sensor system and in the depth-of-field range of the imaging sensor of the image detection system. Due to the location of the calibration object on the inside of the engine hood, no external calibration object is necessary. This is said to yield cost advantages in the manufacture of the vehicle, in the repair shop, and also for the owner of the vehicle because the imaging sensor system may be calibrated for the first time without the use of complex external instrument technology and may be recalibrated at any time, if necessary.

Although the calibration device suggested by US2009033926 may for some applications provide for sufficient calibration of an imaging sensor, the device of US2009033926 is not suitable for the calibration of sensor clusters comprising multiple sensors, which, due to e.g. differences in alignment between sensors of different sensor clusters may provide insufficient alignment for proper functioning of certain kinds of sensors, such as narrow beam sensors, e.g. RADAR, LIDAR or LASER technology based sensors.

SUMMARY

Embodiments herein aim to provide an improved method for calibrating sensor clusters which enables the provision of simple and sufficient alignment for proper functioning of most kinds of sensors.

This is provided through a method for calibrating a sensor cluster which is located at an inside of a windshield of a motor vehicle and arranged such that the pitch thereof is adjustable, which sensor cluster at least comprises a narrow beam sensor and an imaging sensor both of which are directed forward of the motor vehicle, and where an angle gamma between the center directions of the narrow beam sensor and the imaging sensor of the sensor cluster has been pre-calibrated and stored in at least one memory unit, which method further comprises the steps of: calibrating at least one of the narrow beam sensor and the imaging sensor of the sensor cluster with respect to a geometrical travel axis of the motor vehicle; recording a measure epsilon corresponding to an angle between a center direction of the imaging sensor and a reference provided by a fixed vehicle structural part; and storing the recorded measure epsilon in the at least one memory unit.

The provision of recording and storing of the measure epsilon, corresponding to an angle between a center direction of the imaging sensor and a reference provided by a fixed vehicle structural part, makes calibration of a vehicle sensor cluster possible at any location, i.e. without a trip to a service station having a designated calibration station.

According to a second aspect the step of calibrating at least one of the narrow beam sensor and the imaging sensor of the sensor cluster comprises calibrating the center direction of at least one of the narrow beam sensor and the imaging sensor with respect to a geometrical travel axis of the motor vehicle such that the deviation from this axis lies within ±1°.

The provision of careful calibration of at least one sensor with respect to a geometrical travel axis of the motor vehicle such that the deviation from this axis lies within ±1° enables sufficient alignment of the narrow beam sensor for optimal operation thereof.

According to a third aspect the step of recording the measure epsilon comprises recording at least one copy of the measure epsilon in a memory unit arranged integral with the sensor cluster and at least one copy of the measure epsilon in a memory unit separate from the sensor cluster.

The provision of doubled storage of the measure epsilon makes it possible to obtain calibration data if the sensor cluster has to be changed to a spare part by obtaining this calibration data either from the sensor cluster, or should e.g. the memory unit thereof be damaged, from the memory unit separate from the sensor cluster.

According to a fourth aspect the step of recording the measure epsilon in a memory unit separate from the sensor cluster comprises recording at least one copy of the measure epsilon in a memory unit arranged at the specific vehicle.

The provision of doubled storage of the measure epsilon, one of which is arranged at the specific vehicle, makes it possible to obtain calibration data if the sensor cluster has to be changed to a spare part by obtaining this calibration data either from the sensor cluster, or should e.g. the memory unit thereof be damaged, from the memory unit separate from the sensor cluster arranged at the specific vehicle.

According to a fifth aspect the fixed vehicle structural part is an edge of an engine hood of the vehicle.

Basing the measure epsilon on the edge of an engine hood of the vehicle, which is a fixed vehicle structural part that is always present in the field of view of the imaging sensor, it is possible to have the sensor cluster monitor is calibration state.

According to a sixth aspect a motor vehicle is envisaged which comprises a sensor cluster, which at least comprises a narrow beam sensor and an imaging sensor, and which sensor cluster has been calibrated in accordance with the method described herein.

A motor vehicle comprising a sensor cluster calibrated in accordance with the method described herein allows for re-calibration, e.g. following replacement of a faulty sensor cluster or broken windscreen, at any location, i.e. without a trip to a service station having a designated calibration station.

BRIEF DESCRIPTION OF THE DRAWINGS

In the following, embodiments herein will be described in greater detail by way of example only with reference to attached drawings, in which.

Figure 1:
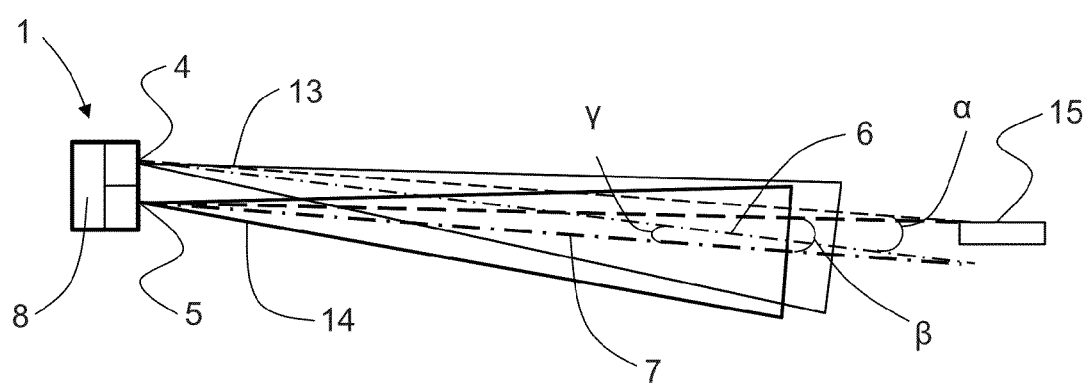
FIG. 1 is a schematic illustration of how sensors of sensor clusters are calibrated against each other.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

As required, detailed embodiments of the present disclosure are presented herein. However, it is to be understood that the disclosed embodiments are merely exemplary of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

In overview, embodiments herein relate to a method for calibrating a sensor cluster 1 which is located at a motor vehicle 3, which sensor cluster 1 at least comprises a narrow beam sensor 4 and an imaging sensor 5 mounted in the same housing. The sensors 4, 5 of such sensor clusters 1 are calibrated against each other during manufacture of the sensor cluster 1, such that the respective sensors 4, 5 are correctly aligned with each other. As the sensors 4, 5 usually are arranged side-by-side, horizontally or vertically, this alignment usually means that there will be an angle between the directions 6, 7 of the two sensors 4, 5. In the following this angle between the directions of the two sensors 4, 5 will be referred to as the angle gamma $\gamma$.

The narrow beam sensor 4 may be a Radio Detection And Ranging (RADAR) technology sensor or a Light Detection And Ranging (LIDAR) technology sensor or other sensor based on Light Amplification by Stimulated Emission of Radiation (LASER) technology or any type of sensor having a narrow sensing beam requiring high accuracy alignment.

The imaging sensor 5 may be a video sensor, designed as either a Charge-Coupled Device (CCD) camera or a Complementary Metal-Oxide Semiconductor (CMOS) camera, for example.

In accordance herewith, the sensor cluster 1 comprises a memory unit 8, and following manufacture and alignment of the sensors 4, 5 of the sensor cluster 1, the angle between the directions of the two sensors 4, 5 gamma, hereafter $\gamma$, is recorded and stored in the memory unit 8 of the sensor cluster 1.

The sensor cluster 1, having the angle $\gamma$ between the directions of the two sensors 4, 5 stored in the memory unit 8 thereof, is mounted to the inside of a windshield 2 of a vehicle 3 under production in the vicinity of the rear-view mirror (not shown) and such that the sensors 4, 5 of the sensor cluster 1 are forward looking, in relation to the normal direction of travel of the vehicle 3.

As illustrated in FIG. 1, where some sizes and angles have been exaggerated in order to facilitate understanding, the angle which the imaging sensor 5 sees will hereafter be referred to as beta, hereafter $\beta$, and is the angle between the center 7 of the imaging sensors 5 sight cone 14 and a reference horizon 15. The angle between the center of the narrow beam sensors 4 sight cone 13 and the reference horizon 15 will hereafter be referred to as alpha, hereafter $\alpha$. The angle $\gamma$ is the angle between the directions of the two sensors 4, 5 of the sensor cluster 1. Thus, the angle gamma $\gamma$ is the difference between the angles alpha and beta, such that $\gamma = \alpha - \beta$. The angles $\alpha$ and $\beta$ may also be recorded and stored in the memory unit 8 of the sensor cluster 1. As illustrated in FIG. 1 the centers 6, 7 of the sensors sight cones 13, 14 are targeted slightly below the reference horizon 15, this as the sensor cluster 1 usually is mounted quite high up in the motor vehicle 3, as mentioned above usually to the inside of the windshield 2 of the vehicle 3 and in the vicinity of the rear-view mirror (not shown), and thus advantageously needs to be directed slightly downwards in order to take advantage of the most appropriate reflecting surfaces of forward vehicles, such as the rear lights and the usually highly reflective license plates.

Figure 2:
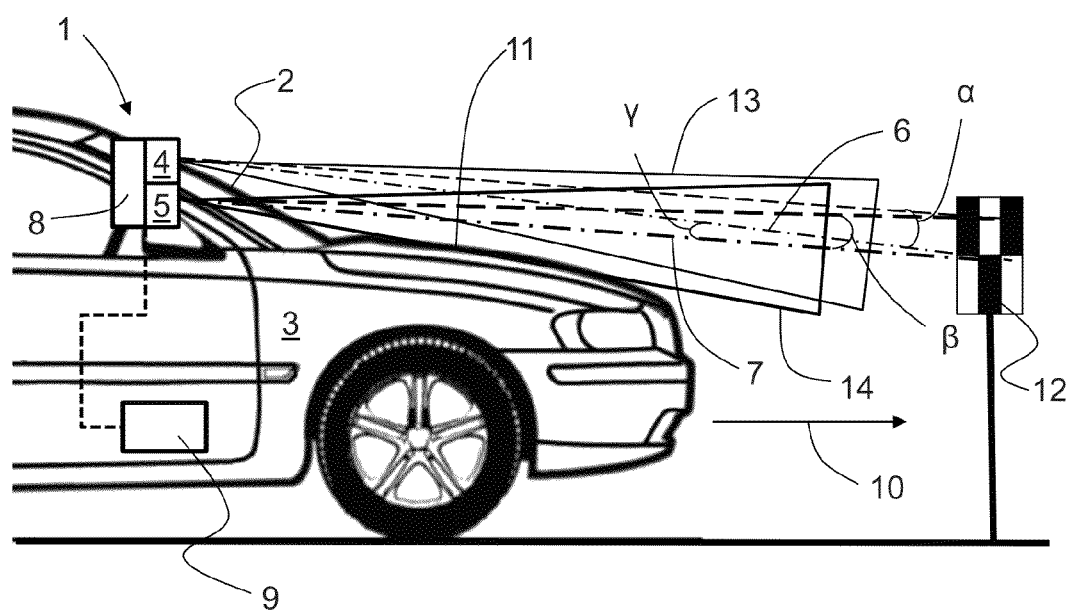
FIG. 2 is a schematic illustration of the recording of a measure epsilon corresponding to an angle between a center direction of an imaging sensor and a reference provided by a fixed vehicle structural part.

According to a first embodiment hereof, as illustrated in FIG. 2, where some sizes and angles likewise have been exaggerated in order to facilitate understanding, is proposed a method for calibrating a sensor cluster 1, which is located at an inside of a windshield 2 of a motor vehicle 3 and arranged such that the pitch thereof is adjustable. For adjustability the sensor cluster 1 may be mounted on a hinge, enabling it to be tilted in pitch, i.e. vertically, through the manipulation of an adjustment screw or similar.

The sensor cluster 1 at least comprises a narrow beam sensor 4 and an imaging sensor 5, both of which are directed forward of the motor vehicle 3, and where an angle gamma γ between the center directions 6, 7 of the narrow beam sensor 4 and the imaging sensor 5 of the sensor cluster 1 has been pre-calibrated and stored in at least one memory unit 8, 9.

Initially the step of calibrating at least one of the narrow beam sensor 4 and the imaging sensor 5 of the sensor cluster 1 with respect to a geometrical travel axis 10 of the motor vehicle 3 is performed. It is to be noted that on account of manufacturing tolerances, the longitudinal axis of the vehicle may not correspond exactly to the geometrical travel axis 10 of the motor vehicle 3, which is usually defined by the bisector of the rear axle's total toe-in angle.

For this step the vehicle 3 under production is brought to a designated calibration station, where the narrow beam sensor 4 or the imaging sensor 5 of the sensor cluster 1 is calibrated with respect to the geometrical travel axis 10 of the motor vehicle 3. The designated calibration station is suitably arranged such that the floor thereof is perfectly level and horizontal and such that the vehicle 3, for which calibration is to be performed, can be placed perfectly positioned and aligned at this floor, such that the relation to one or more special calibration targets 12 in the vicinity of the vehicle 3 is ensured.

Once the calibration step above has been performed the imaging sensor 5 of the sensor cluster 1 will, within its field of view, have a fixed vehicle 3 structural part 11, here an edge of the engine hood 11 of the vehicle 3. The edge of the engine hood 11 of the vehicle 3 is also within a detection range of the imaging sensor 5 and in the depth-of-field range of the imaging sensor 5 of the sensor cluster 1. As the aperture of the imaging sensor 5 is known it is now possible to obtain a measure of the angle which the imaging sensor 5 sees, e.g. from the distance to the reference provided by the edge of the engine hood 11 of the vehicle 3 and the number of pixels between the edge of the engine hood 11 of the vehicle 3 and the border of an acquired image.

Thus the initial calibration step is followed by a step of recording a measure, hereafter called epsilon ϵ, which measure epsilon ϵ corresponds to an angle between a center direction 7 of the imaging sensor 5 and a reference provided by a fixed vehicle 3 structural part 11.

Thereafter the step of storing the recorded measure epsilon ϵ in the at least one memory unit 8, 9 is performed.

Having recorded and stored the measure epsilon ϵ, corresponding to the angle between the center direction of the imaging sensor 7 and the reference provided by the fixed vehicle 3 structural part 11, it becomes possible to calibrate the vehicle sensor cluster 1 at any location, i.e. without a trip to a service station having a designated calibration station.

In some embodiments hereof the step of calibrating at least one of the narrow beam sensor 4 and the imaging sensor 5 of the sensor cluster 1 comprises calibrating the center direction 6, 7 of at least one of the narrow beam sensor 4 and the imaging sensor 5 with respect to a geometrical travel axis 10 of the motor vehicle 3 such that the deviation from this axis 10 lies within ±1°.

Careful calibration of at least one sensor with respect to the geometrical travel axis 10 of the motor vehicle 3 such that the deviation from this axis lies within ±1° makes it possible to achieve sufficient alignment of a narrow beam sensor for optimal operation thereof, in particular if it becomes necessary to replace the narrow beam sensor 4 or an associated windshield 2, to which the narrow beam sensor 4 is attached.

In further embodiments hereof the step of recording the measure epsilon ϵ comprises recording at least one copy of the measure epsilon ϵ in a memory unit 8 arranged integral with the sensor cluster 1 and at least one copy of the measure epsilon 8 in a memory unit 9 separate from the sensor cluster 1.

This kind of doubled storage of the measure epsilon ϵ makes it possible to obtain calibration data when the sensor cluster 1 has to be changed to a spare part. This as it now is possible to obtain this calibration data either from the memory unit 8 of the sensor cluster 1, or should e.g. the memory unit 8 thereof be damaged, from the memory unit 9, which is separate from the sensor cluster. Such a secondary backup memory unit 9 may, e.g., be arranged as part of a service database, which may be a cloud based service accessible by service stations, a database kept by the vehicle manufacturer or a database kept by a chain of service stations or similar.

In yet some embodiments hereof the step of recording the measure epsilon ϵ in a memory unit 9 separate from the sensor cluster 1 comprises recording at least one copy of the measure epsilon ϵ in a memory unit 9 arranged at the specific vehicle 3.

The provision of a secondary backup memory unit 9 at the specific vehicle 3 makes it possible to obtain calibration data for that specific vehicle 3 should the sensor cluster 1 have to be changed to a spare part. Thus, if the memory unit 8 of the sensor cluster 1 to be replaced is damaged, calibration data may be gathered from the memory unit 9 arranged at the specific vehicle 3.

In still further embodiments hereof the fixed vehicle 3 structural part 11 is an edge of an engine hood of the vehicle 3.

The fact that the measure epsilon ϵ is based on the edge of the engine hood 11 of the vehicle 3, which edge is a fixed vehicle structural part 11 that is always present in the field of view of the imaging sensor 5, it is possible to have the sensor cluster 1 monitor its calibration state. Hereby it becomes possible to e.g. trigger a fault message to a vehicle operator, should the imaging sensor 5 be unable to detect this fixed vehicle structural part 11. The possibility of providing further detection and diagnostic functions for the sensor cluster 1 based on this fact is also envisaged.

Thus, the above method permits autonomous calibration (i.e., independently of a service station) of an onboard sensor cluster 1 using onboard means relying on a calibration object 11 present at the vehicle, relying on which object 11 the sensor cluster 1 of the vehicle 3 is calibratable. The calibration object 11 is within the field of vision of the imaging sensor 5 of the sensor cluster 1 at all times. This is accomplished in a particularly simple and advantageous manner by using as a calibration object 11 an edge of the engine hood of the vehicle 3, as illustrated in FIG. 2. The edge of the engine hood 11 of the vehicle 3 is within a detection range of the imaging sensor 5 and in the depth-of-field range of the imaging sensor 5 of the sensor cluster 1.

FIG. 2 shows the edge of the engine hood 11 of the vehicle 3. Due to the location of the calibration object 11 at the edge of the engine hood of the vehicle 3, no external calibration object is necessary. This yields cost advantages, in the repair shop, and also for the owner of the vehicle 3 because the sensor cluster 1 may, if necessary, be recalibrated at any time without the use of complex external instrument technology. Since the engine hood and the edge 11 thereof is aligned accurately with the vehicle 3 by design, the calibration object 11 already has a precise reference position which facilitates good calibration of the sensor cluster 1.

Hence, during calibration of a new replacement sensor cluster 1 the setpoint can be calculated from the recorded measure epsilon ϵ and the angle γ recorded and stored for the new replacement sensor cluster 1. A delta value between the setpoint and the actual position is displayed at a display device (not shown) of the vehicle 3 and service personnel may turn the adjustment screw until the difference is within desired limits, e.g. indicated by a visual and/or audible signal indicating that calibration has been achieved.

If the sensor cluster 1 is mounted on a windscreen 2, where the windscreen 2 needs to be replaced, no special tools are needed nor any special training and experience, for recalibrating the sensor cluster following replacement of the windscreen 2. This is possible since the measure epsilon ϵ is known by the sensor cluster and stored in the memory unit 8 thereof. Angle changes to the chassis of the vehicle 3 caused by the replacement of the windscreen 2 are registered upon powering up the vehicle or turning on the ignition. If the deviation is such that the previously stored measure epsilon ϵ reaches a limit for the accuracy needed a message is displayed that a re-calibration is required. Basic instructions on how to re-calibrate the sensor cluster 1 may be delivered together with the replacement windscreen 2, and re-calibration thereof may be done using a screw driver or similar basic tool.

Thus, when the sensor cluster is powered on and the workshop personnel e.g. are activating a certain switch procedure described in the instructions accompanying the replacement windscreen 2, directions of how to perform calibration may be displayed, guiding workshop personnel as to in which direction adjustment needs to be done. Once the measure epsilon ϵ indicates a calibration angle that is within appropriate limits, a visual and/or an audible signal may be activated, informing that proper calibration has been achieved.

In accordance with the present application is also envisaged a motor vehicle 3 comprising a sensor cluster 1, which at least comprises a narrow beam sensor 4 and an imaging sensor 5, and which sensor cluster 1 has been calibrated in accordance with the above method.

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

While exemplary embodiments are described above, it is not intended that these embodiments describe all possible forms of the present disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method for calibrating a sensor cluster located at an inside of a windshield of a motor vehicle and arranged such that the pitch thereof is adjustable, the sensor cluster comprising a narrow beam sensor and an imaging sensor both of which are directed forward of the motor vehicle, and where an angle gamma (γ) between center directions of the narrow beam sensor and the imaging sensor of the sensor cluster has been pre-calibrated and stored in at least one memory unit, the method comprising:

calibrating at least one of the narrow beam sensor and the imaging sensor of the sensor cluster with respect to a geometrical travel axis of the motor vehicle;

recording a measure epsilon (ϵ) corresponding to an angle between the center direction of the imaging sensor and a reference provided by a fixed vehicle structural part; and storing the recorded measure epsilon (ϵ) in the at least one memory unit.

2. A method for calibrating a sensor cluster according to claim 1, wherein calibrating at least one of the narrow beam sensor and the imaging sensor of the sensor cluster comprises calibrating the center direction of at least one of the narrow beam sensor and the imaging sensor with respect to a geometrical travel axis of the motor vehicle such that deviation from this axis lies within ±1°.

3. A method for calibrating a sensor cluster according to claim 1, wherein recording the measure epsilon (ϵ) comprises recording at least one copy of the measure epsilon (ϵ) in a memory unit arranged integral with the sensor cluster and at least one copy of the measure epsilon (ϵ) in a memory unit separate from the sensor cluster.

4. A method for calibrating a sensor cluster according to claim 3, wherein recording the measure epsilon (ϵ) in a memory unit separate from the sensor cluster comprises recording at least one copy of the measure epsilon (ϵ) in a memory unit arranged at the vehicle.

5. A method for calibrating a sensor cluster according to claim 1, wherein the fixed vehicle structural part is an edge of an engine hood of the vehicle.

6. A motor vehicle comprising a sensor cluster, the sensor cluster comprising a narrow beam sensor and an imaging sensor, wherein the sensor cluster is adapted to be calibrated in accordance with the method of claim 1.

7. A method for calibrating a sensor cluster according to claim 2, wherein recording the measure epsilon (ϵ) comprises recording at least one copy of the measure epsilon (ϵ) in a memory unit arranged integral with the sensor cluster and at least one copy of the measure epsilon (ϵ) in a memory unit separate from the sensor cluster.

8. A method for calibrating a sensor cluster according to claim 7, wherein recording the measure epsilon (ϵ) in a memory unit separate from the sensor cluster comprises recording at least one copy of the measure epsilon (ϵ) in a memory unit arranged at the vehicle.

9. A method for calibrating a sensor cluster according to claim 2, wherein the fixed vehicle structural part is an edge of an engine hood of the vehicle.

10. A method for calibrating a sensor cluster according to claim 3, wherein the fixed vehicle structural part is an edge of an engine hood of the vehicle.

11. A method for calibrating a sensor cluster according to claim 4, wherein the fixed vehicle structural part is an edge of an engine hood of the vehicle.

12. A method for calibrating a sensor cluster according to claim 7, wherein the fixed vehicle structural part is an edge of an engine hood of the vehicle.

13. A method for calibrating a sensor cluster according to claim 8, wherein the fixed vehicle structural part is an edge of an engine hood of the vehicle.

14. A sensor cluster comprising a narrow beam sensor and an imaging sensor, wherein the sensor cluster is adapted to be calibrated in accordance with the method of claim 1.

* * * * *